Feb. 18, 1936.  D. L. WHITE  2,030,949

MIXING MILL

Filed Dec. 19, 1934

Inventor
Douglas L. White
By Eakin & Avery
Attys.

Patented Feb. 18, 1936

2,030,949

UNITED STATES PATENT OFFICE 2,030,949

MIXING MILL

Douglas L. White, Watertown, Mass., assignor to Hood Rubber Company, Inc., Watertown, Mass., a corporation of Delaware Application December 19, 1934, Serial No. 758,223

1 Claim. (Cl. 18—2)

This invention relates to mixing mills such as are used for mixing rubber compositions or the like.

A defect in such mills as heretofore used has been that when the adjusting screws are backed off to permit the gap between the rolls to widen, as at the end of the mixing of a batch, the adjacent roll does not always follow along with the receding screws and a lost-motion gap has resulted between its trunnion or bearing blocks and the screws. Then when a new batch, usually of cool and stiff stock, is put into the mill the roll next to the adjusting screws is suddenly forced outward, with a resulting impact of its bearing blocks against the shear plates which are mounted between them and the adjusting screws, which frequently causes breakage and necessitates renewal of the shear plates.

The chief objects of my invention are to correct this matter and to do so in a simple, convenient and economical manner.

Figure 1:
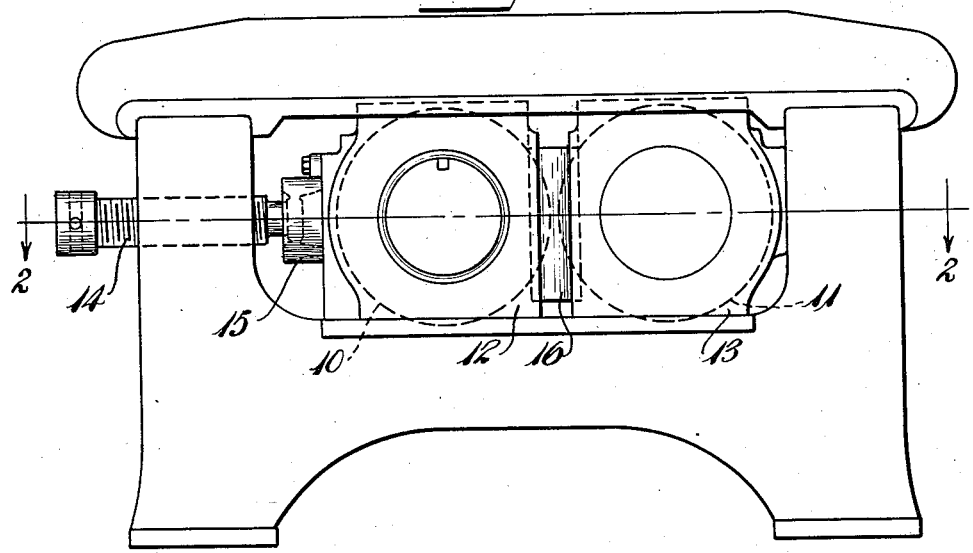
Fig. 1 is an elevation of a mill embodying my invention in its preferred form.
Figure 2:
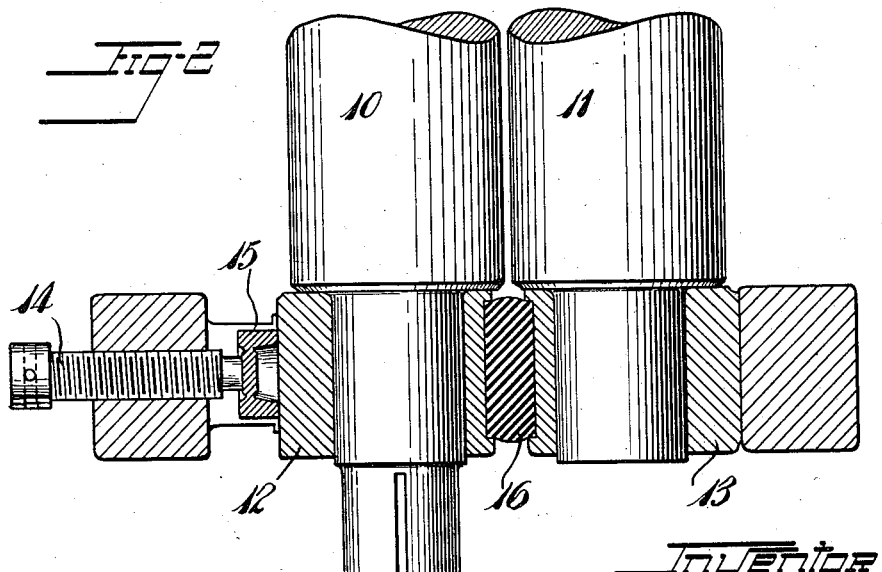
Fig. 2 is a horizontal section of a portion of the same in the region of the journals, on line 2—2 of Fig. 1.

The rolls are shown at 10 and 11, their respective bearing blocks at 12 and 13, one of the adjusting screws at 14, and a shear plate, of the cup type, at 15.

Between the journal blocks I mount a block 16 of resilient vulcanized rubber of such thickness as to be substantially compressed between the blocks when the adjusting screws are set up to even the widest spacing of the rolls employed in operation, so that the rubber block will be securely held in place and by its resilience will compel the rolls to spread apart and the journal block 12 to maintain its contact with the shear plate 15 as the adjusting screws are backed off to their most extreme operating positions, which eliminates the above-described breaking of the shear plates by impact.

Preferably the adjacent faces of the blocks 12 and 13 are recessed as shown for interlocking of the rubber block with them against displacement.

This arrangement, although very simple and inexpensive, is highly effective and dependable, and the rubber blocks may be employed throughout long periods of use without deterioration requiring replacement.

I claim:

A mixing mill comprising a pair of rolls, an adjusting screw therefor, a shear member between the adjusting screw and the trunnion of the adjacent roll, and a resilient member of rubber composition mounted under compression operatively between the trunnions of the rolls.

DOUGLAS L. WHITE.